Patented Sept. 24, 1935

2,015,207

UNITED STATES PATENT OFFICE 2,015,207

PROCESS OF VULCANIZING RUBBER

Sidney L. Weller, Evanston, Ill., assignor to E. I. du Pont de Nemours & Company, Wilmington, Del., a corporation of Delaware No Drawing. Application November 8, 1933, Serial No. 697,110

11 Claims. (Cl. 18—47)

This invention relates to methods of molding and vulcanizing rubber. In particular it relates to means for preventing the adhesion of the rubber to the mold. Still more particularly it relates to the use of higher alkyl sulfate ester salts in coating metallic molds used in the molding of rubber articles.

It is an object of this invention to provide a means of preventing rubber from adhering to iron or other metallic molds in which it may be vulcanized.

It is a further object of the invention to improve the surface finish of rubber articles that are vulcanized in metallic molds. It is a still further object of the invention to make it unnecessary to clean such molds as frequently as has heretofore been necessary. Other objects of the invention will appear hereinafter.

The most common method of vulcanizing rubber articles is to place the unvulcanized rubber article, having the approximate size and shape of the finished product, in a steel or other metallic mold in which it is subjected simultaneously to pressure and to the necessary degree of heat for the time required to produce a properly vulcanized product. During vulcanization the rubber flows and takes the imprint of whatever design or lettering may be engraved on the mold. In order to insure the satisfactory operation of the molding process, it is the general practice to treat the mold, before vulcanization, with an agent designed to prevent the rubber from adhering to the mold. Materials commonly used for this purpose include solutions of soap, soap tree bark, sodium hyposulfite and various other chemicals that are applied to a hot mold in the form of a water solution, the water being allowed to evaporate before inserting the unvulcanized article in the mold. Another common practice is to dust the mold lightly with a powder such as talc before inserting the rubber. The unvulcanized article is also often dusted with talc, mica or some other powder to prevent adhesion and improve the surface of the finished vulcanized article. The principal shortcoming of all such methods is that if a sufficient amount of nonadhesive substance is applied before vulcanization, some of it will remain on the mold and ultimately cause a deposit to build up in the mold, which consists in part of the material used for the mold treatment and often consists partly of materials that exude from the article being vulcanized. When such a deposit has been built up on the mold it is more difficult to open the mold and to remove the vulcanized article and, moreover, the surface appearance of the finished product is adversely affected. It, therefore, becomes necessary to clean molds at intervals. The cleaning operation consists in some cases of burning out the deposit with a torch; in other cases it is removed by treating the mold with a blast of a mild abrasive powder such as soapstone; in other cases the mold is cleaned by boiling in a cleaning solution which may be acid or alkaline in nature.

In accordance with the present invention it has been discovered that dilute aqueous solutions of the higher alkyl sulfate ester salts, when applied to metallic molds used in the formation of rubber articles, have the property of preventing the rubber from adhering to the mold more effectively than any of the previously known mold lubricants. These sulfate ester salts all conform to the following formula: $RSO_4M$ in which R is a radical containing from 10 to 20 carbon atoms and M is a metal preferably of the alkali metal group.

The following example illustrates various modes of applying the invention:

Example 1

One gram of lauryl sodium sulfate was dissolved in a liter of water. A steel mold used in molding rubber articles was coated as by brushing, swabbing or spraying with the solution. During constant use of the mold after this treatment, there was very little tendency for the molds to become dirty through the building up of a deposit and the mold was used for a considerable period of time without cleaning.

To illustrate the advantage of the use of the above solution in coating molds, the dilute solution used in the above example was more effective in preventing adhesion of rubber to the mold and in producing a sharply molded article than a 1% soap solution.

The sulfate ester salts used in accordance with the present invention may be prepared by reacting a long chain alcohol having from 10 to 20 carbon atoms with 100% $H_2SO_4$ or with fuming sulfuric acid or chloro-sulfonic acid at a temperature of within the range of about 0° C. to 50° C. In addition to the single alcohols, various mixtures of alcohols, for example those produced by the catalytic hydrogenation of cottonseed oil, palm kernel oil, olive oil, coconut oil and various fats in the presence of a hydrogenating metal and at a temperature of 250° C. to 400° C. can be reacted to give mixed sulfate ester salts. Thus, the mixed alcohols produced catalytically from coconut oil and containing lauryl, myristyl, cetyl and stearyl alcohols yield, upon sulfation and neutralization, very effective treating agents. The same is true of the alkyl sulfate ester salts of mixed oleyl-stearyl alcohols obtained by the saponification of sperm oil.

The amount of sulfate ester salt which will be used in the aqueous mold treating solution will be very small and is preferably of the order of that given in the example. However, proportions somewhat less and somewhat above that given in the example may be used, e. g., solutions of .05% to 1% of alkyl ester salt in water may be used.

Various alkyl ester salts may be used. They are preferably the alkali metal salts such as sodium and potassium, but the ammonium salts and the amine salts may also be used. The salts of sulfate esters of n-primary decyl, lauryl, myristyl, cetyl, stearyl, oleyl, and ricinoleyl alcohol may be used with great efficiency. The alcohols may be saturated or unsaturated. The n-straight chain primary alcohols are preferred. The preferred range of carbon atoms in the esters is 10 to 20, but alcohols such as hexyl and octyl may also be used but with somewhat less degree of efficiency.

While the sulfate ester is preferred, other dibasic organic or inorganic acid esters are included within the scope of the invention, e. g., the alkyl ester salts of phosphoric and lauric acid, and of the various organic dibasic acids, such as oxalic, tartaric, citric, phthalic and the like.

The sodium salts and particularly the sodium salts of the sulfate esters are preferred due to the cheapness and solubility of the sodium sulfate esters and their great efficiency.

The materials are preferably used in the form of a water solution, but suitable organic solvents, e. g., ethyl alcohol can be substituted for water, and it may in some cases be desirable to deposit the alkyl sulfate ester salt on talc or some other dry mineral base and apply it in the form of a dust. Likewise, the lubricant may be applied to the rubber instead of to the mold or to both.

Steel or aluminum molds may be very effectively treated in the manner described above, but molds made of other materials may be treated in like manner.

The invention is applicable not only to molds used in forming natural rubber articles but also to molds used in the fabrication of reclaimed rubber or of synthetic rubber articles. Thus, molds used in forming articles from chloro-2-butadiene-1,3 polymers are effectively treated in accordance with the present invention. The term "rubber" when used throughout the specification and claims, unless otherwise limited, is intended to include rubber either natural, synthetic or artificial and also to include all types of plastic molding compositions.

Any variation from the above description which corresponds to the spirit of the invention, is intended to be included within the scope of the claims.

I claim:

1. In the fabrication of a rubber article by inserting said article in a mold wherein it is subjected to elevated temperatures, the step which comprises interposing between the contacting surfaces of said article and the mold the salt of a polybasic acid ester of an alcohol having from 6 to 20 carbon atoms.

2. The process of claim 1 characterized in that the ester is an ester of sulfuric acid.

3. The process of claim 1 characterized in that the ester is an alkali metal alkyl sulfate.

4. The process of claim 1 characterized in that the ester is a sodium alkyl sulfate.

5. The process of claim 1 characterized in that the ester is an alkali metal alkyl sulfate and is applied in the form of a dilute aqueous solution.

6. The process of claim 1 characterized in that the ester is an alkali metal alkyl sulfate and is applied in the form of a dilute aqueous solution containing from one-tenth to five grams of ester per liter of solution.

7. In the fabrication of a plastic article by inserting said article in a mold whereby it is subjected to elevated temperatures, the step which comprises interposing between the contacting surfaces of said article and the mold a salt of a polybasic acid ester of a normal primary alcohol having from 10 to 20 carbon atoms.

8. In the fabrication of a rubber article by inserting said article in a mold wherein it is subjected to elevated temperatures, the step which comprises interposing between the contacting surfaces of said article and the mold the salt of a sulfuric acid ester of a mixture of normal primary alcohols having from 6 to 20 carbon atoms, one of which is lauryl alcohol.

9. In the fabrication of a rubber article by inserting said article in a mold wherein it is subjected to elevated temperatures, the step which comprises interposing between the contacting surfaces of said article and the mold the salt of a sulfuric acid ester of a mixture of normal primary alcohols having from 6 to 20 carbon atoms, one of which is stearyl alcohol.

10. In the fabrication of a rubber article by inserting said article in a mold wherein it is subjected to elevated temperatures, the step which comprises interposing between the contacting surfaces of said article and the mold the sodium salt of a sulfuric acid ester of a mixture of normal primary alcohols having from 6 to 20 carbon atoms, one of which is lauryl alcohol.

11. In the fabrication of a rubber article by inserting said article in a mold wherein it is subjected to elevated temperatures, the step which comprises interposing between the contacting surfaces of said article and the mold the sodium salt of a sulfuric acid ester of a mixture of normal primary alcohols having from 6 to 20 carbon atoms, one of which is stearyl alcohol.

SIDNEY L. WELLER.